United States Patent
Keluskar et al.

(12)

(10) Patent No.: US 12,112,588 B2
(45) Date of Patent: Oct. 8, 2024

(54) SYSTEMS AND METHODS FOR PREDICTION OF COMPONENT DEGRADATION

(71) Applicant: DANA AUTOMOTIVE SYSTEMS GROUP, LLC, Maumee, OH (US)

(72) Inventors: Anoop Keluskar, Maumee, OH (US); Sandip Rakhe, Maumee, OH (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 353 days.

(21) Appl. No.: 17/661,018

(22) Filed: Apr. 27, 2022

(65) Prior Publication Data

US 2022/0351554 A1 Nov. 3, 2022

(30) Foreign Application Priority Data

Apr. 28, 2021 (IN) .............................. 202111019512

(51) Int. Cl.
  *G07C 5/04* (2006.01)
  *F16C 41/00* (2006.01)
  *G07C 5/00* (2006.01)

(52) U.S. Cl.
  CPC .............. *G07C 5/04* (2013.01); *F16C 41/007* (2013.01); *G07C 5/008* (2013.01); *F16C 2233/00* (2013.01)

(58) Field of Classification Search
  CPC .... F16C 41/007; F16C 2233/00; G07C 5/008; G07C 5/04
  See application file for complete search history.

(56) References Cited

U.S. PATENT DOCUMENTS

| | | | |
|---|---|---|---|
| 7,561,035 B2 | 7/2009 | Sahashi et al. | |
| 9,897,516 B2 | 2/2018 | Bechhoefer et al. | |
| 2021/0061027 A1* | 3/2021 | Da Deppo | B60C 23/041 |

FOREIGN PATENT DOCUMENTS

| | | | | |
|---|---|---|---|---|
| CN | 108181105 A | * | 6/2018 | ............ G01M 13/04 |
| CN | 209133192 U | * | 7/2019 | |
| CN | 107766628 B | * | 11/2019 | ......... G06F 17/5009 |
| CN | 112784744 A | * | 5/2021 | ......... G06K 9/00503 |
| CN | 111597682 B | * | 3/2023 | ............ G01M 13/04 |
| JP | 2019130151 A | * | 8/2019 | |
| PL | 240900 B1 | * | 6/2022 | |
| WO | WO-2021148983 A1 | * | 7/2021 | ................ A61P 7/00 |

* cited by examiner

*Primary Examiner* — Vivek D Koppikar
*Assistant Examiner* — Farhad Dawodi
(74) *Attorney, Agent, or Firm* — McCoy Russell LLP (57) ABSTRACT

Methods and systems are provided for diagnostics and/or prognostics of a vehicle center bearing with integrated sensors. A method includes generating a degradation analysis of the center bearing from real-time vehicle operating data, the data including feedback from one or more of a temperature sensor, a displacement sensor, and an accelerometer wired to a battery integrally arranged in a bearing compartment of a vehicle.

14 Claims, 4 Drawing Sheets

SYSTEMS AND METHODS FOR PREDICTION OF COMPONENT DEGRADATION

CROSS-REFERENCE TO RELATED APPLICATION

The present application claims priority to Indian Patent Application No. 202111019512, entitled "E-CENTER-BEARING FOR LIFE PREDICTION OF CENTER BEARING KIT", and filed on Apr. 28, 2021. The entire contents of the above-listed application is hereby incorporated by reference for all purposes.

TECHNICAL FIELD

The present description relates generally to forecasting a remaining-useful-life (RUL) of a vehicle shaft.

BACKGROUND AND SUMMARY

Vehicles can operate in severe and diverse terrains such as mines, sand beds, highways, mountain passes, stone crusher applications, and other off-road conditions harsher than paved or gravel environments. These conditions may lead to accelerated degradation of one or more vehicle components. It may be desired to anticipate an estimated degradation of a component to mitigate repairs and repair costs. As another example, scheduled maintenance may be desired for vehicles in a vehicle fleet. To increase efficiency and plan for when one or more vehicles may demand maintenance, maintenance forecasting may be desired.

The inventors herein have recognized these issues and come up with a way to at least partially solve them. In one example, a center bearing diagnostic or prognostic method is provided that comprises generating a degradation analysis of the center bearing from real-time vehicle operating data, the data formed from one or more of a temperature sensor, a displacement sensor, and an accelerometer wired to a battery integrally arranged in a bearing compartment of the vehicle.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The advantages described herein will be more fully understood by reading an example of an embodiment, referred to herein as the Detailed Description, when taken alone or with reference to the drawings, where.

DETAILED DESCRIPTION

Figure 1:
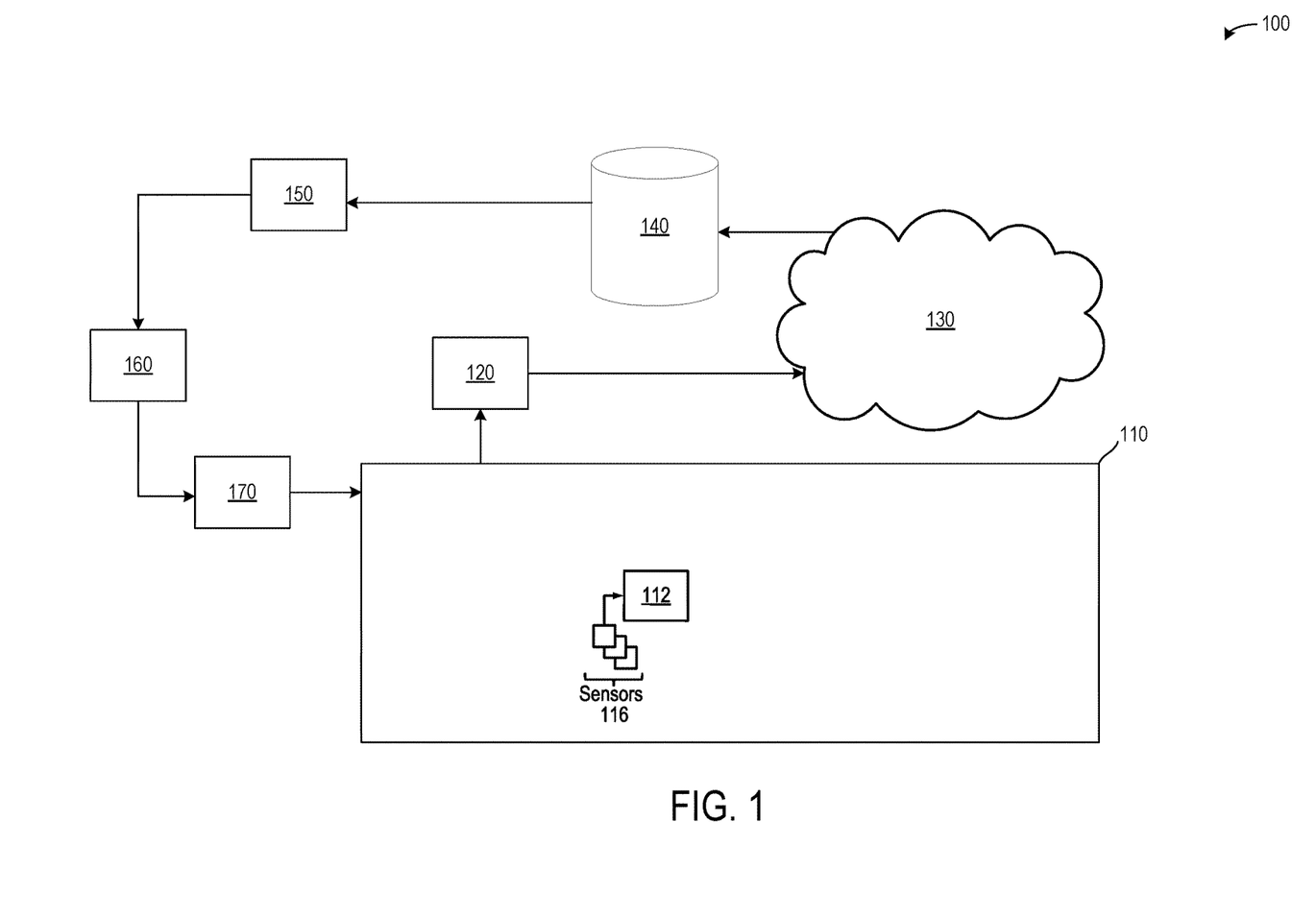
FIG. 1 illustrates a schematic of a network in wireless communication with a vehicle.
Figure 2:
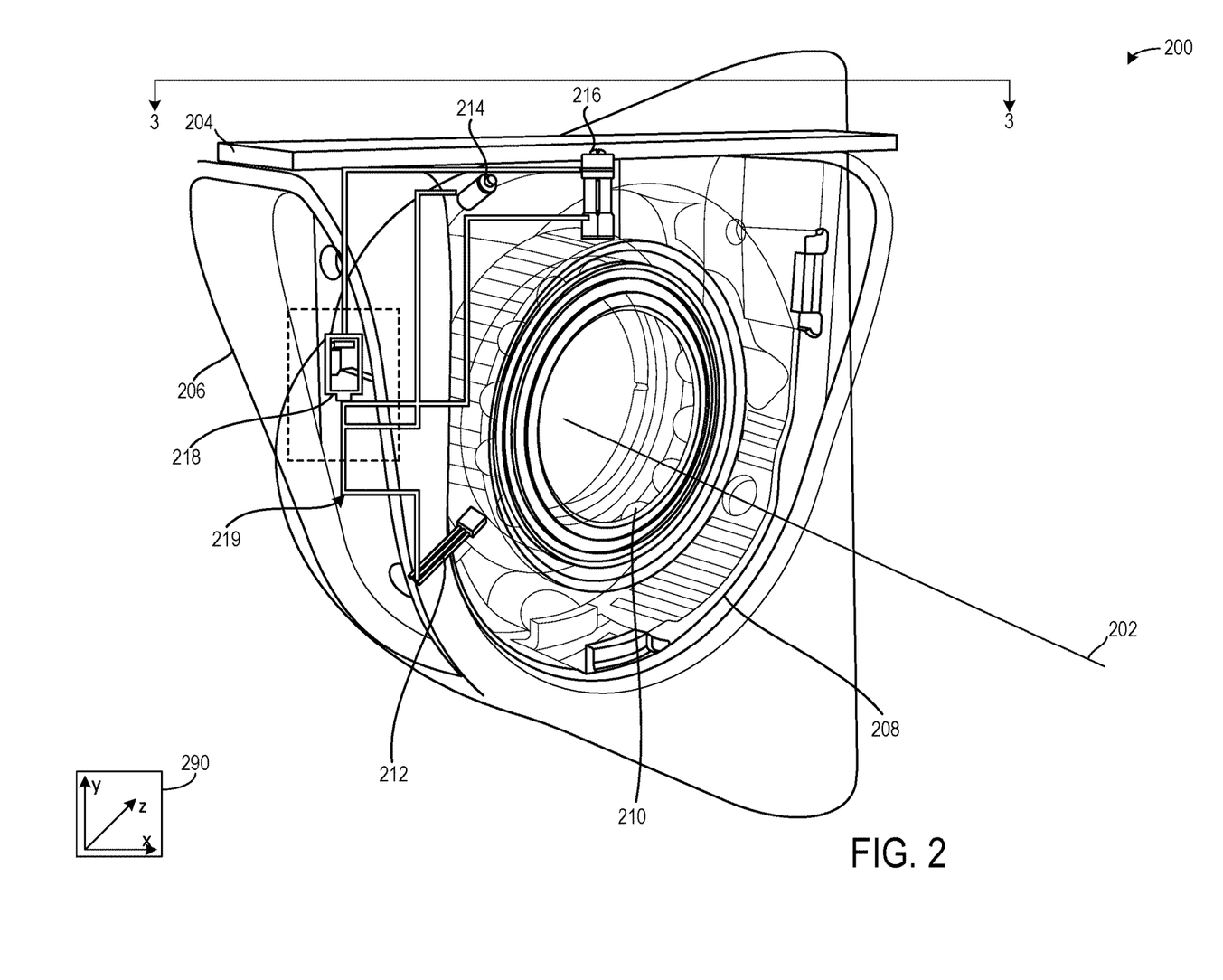
FIG. 2 illustrates an embodiment of a bearing.
Figure 3A:
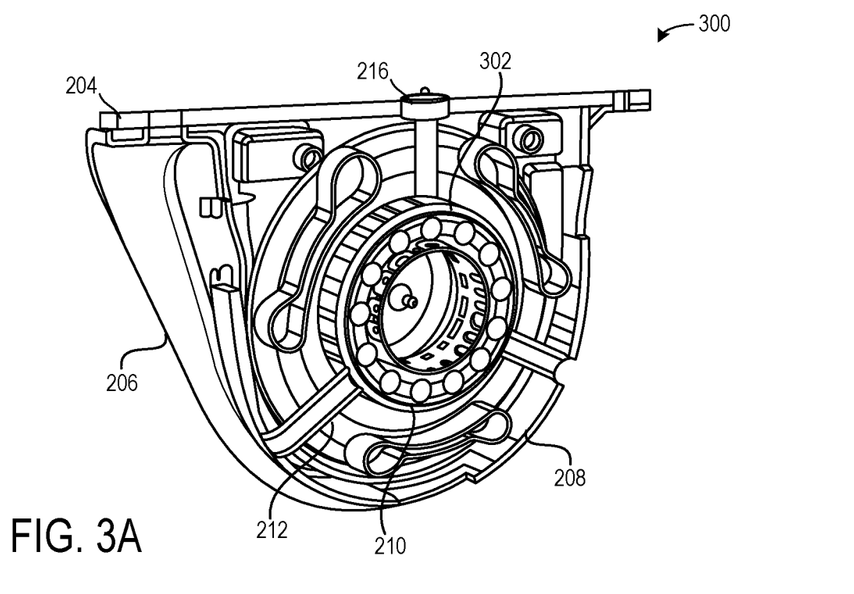
FIG. 3A illustrates a cross-section of the bearing taken along cutting plane 3-3.
Figure 3B:
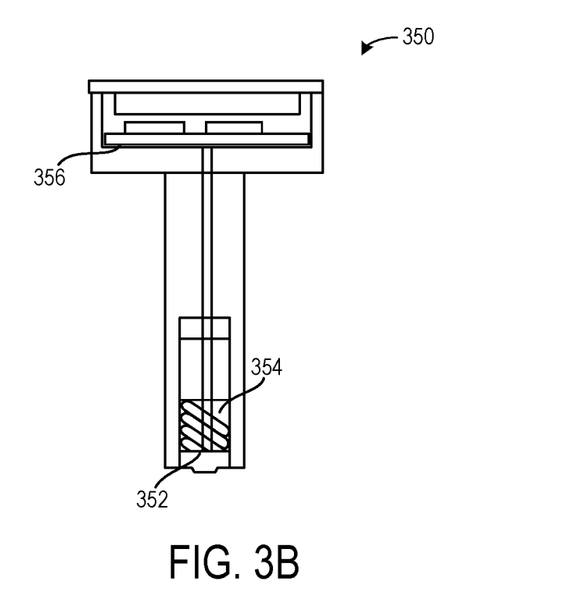
FIG. 3B illustrates a cross-section of a sensing device taken along the cutting plane 3-3.
Figure 4:
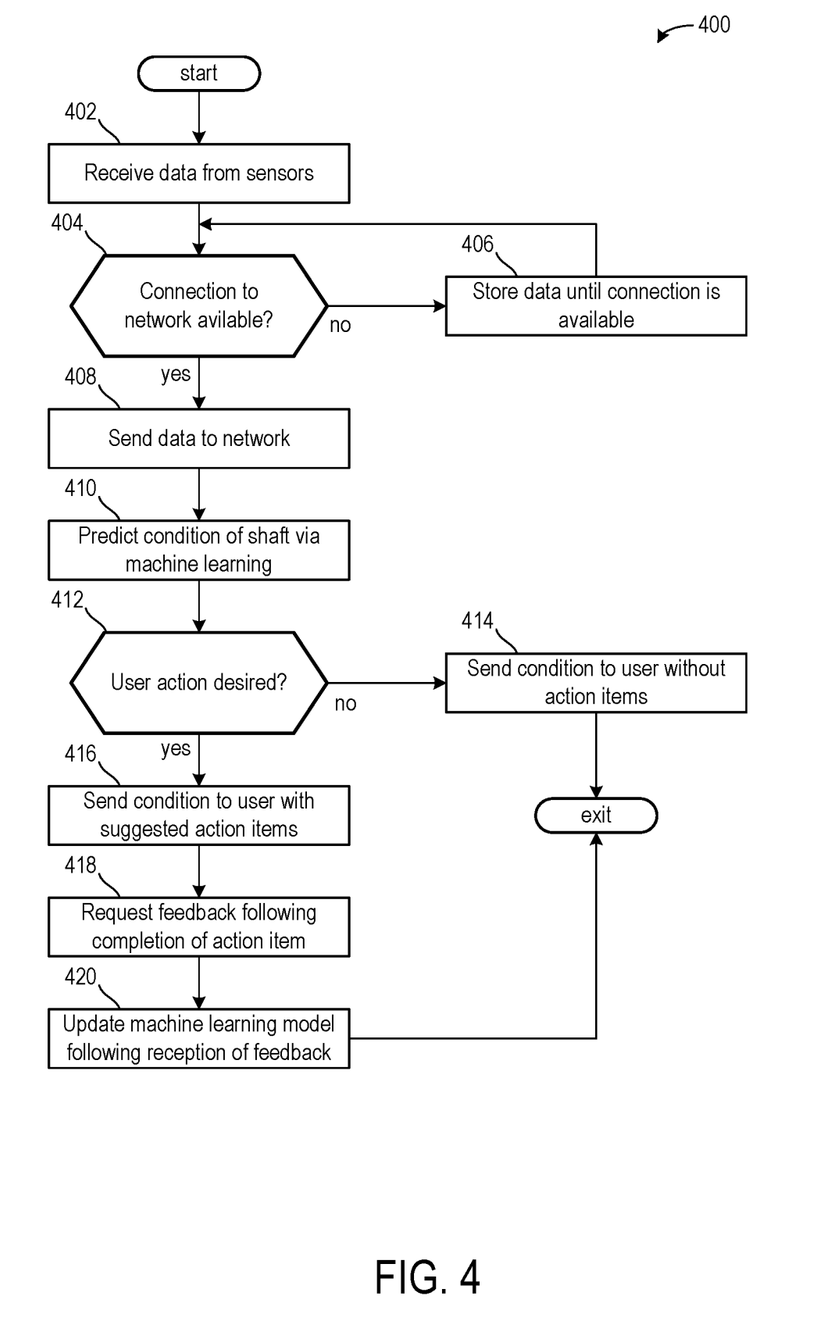
FIG. 4 illustrates a method for predicting degradation based on information provided from the vehicle to the network.

The following description relates to systems and methods for diagnosing a remaining-useful-life (RUL) of a vehicle component. In one example, the vehicle may be in wireless communication with a network, as shown in FIG. 1. The diagnosing may be in regard to a center bearing life prediction system, method, and/or kit. Center-bearing degradation in systems where it includes a propeller shaft can cause increased vehicle noise, vibration, and harshness. The increase vibration may cause the vehicle in which the system is incorporated to have increased down-time, or vehicle off road (VOR) condition. VOR results in loss of productivity for contract drivers and fleet owners. The center-bearing is illustrated in FIGS. 2 and 3A. An example of a sensing device is shown in FIG. 3B. A method for diagnosing the central bearing is shown in FIG. 4.

In one example, at least some of the above issues may be addressed by data acquisition of temperature, vibration and axial displacement through sensors, such as low energy sensors, which may be positioned in various locations, including from such sensor positioned within the center bearing mounted with the propeller shaft. Data acquired by the sensor(s) can be transmitted to an electronic gateway through a wireless transmission, such as Bluetooth low energy (BLE). The data can then be transmitted to off-board the vehicle, such as to a cloud server using on or more communication protocols such as the Global System for Mobile Communications standard, GSM. The data can then be used with one or more machine learning algorithms to predict the estimated life of the particular center bearing in the vehicle. Finally, the expected life from the machine learning algorithms can be sent back to the vehicle or fleet manager and then displayed to the end customer as required to take preventive action accordingly.

In this way, a customer can receive warning notifications in advance of degradation that sidelines the vehicle. Based on this information, the customer can replace the center bearing in advance to avoid unexpected degradation conditions.

In one example manifestation, the approach is particularly applicable to the unavailability of live data of vehicle operating conditions, especially for large fleet owners. This unavailability creates a problem for fleet owners in terms of unexpected degradations and lack of preventive maintenance. Further, the vehicles may be electric or electrified vehicles utilizing a prop shaft with a center bearing. If the prop shaft of the vehicle degrades in the middle of a duty-trip, it is difficult to bring the vehicle to the service station for replacement. This causes a loss of trip time and revenue for the fleet owners. Further, there is a lack of data of the vehicle operating conditions during post-degradation analysis. This may lead to an inefficient and time intensive analysis with no guarantee for root cause findings.

As such, in the example manifestation, to predict the upcoming degradation, beforehand, in terms of miles-to-degradation, continuous data acquisition of specific factors that affect the life of the shaft are provided, with the specific data from specific locations in the center bearing tailored specially for more accurate prop shaft diagnoses and prognosis. Advantageously, this particular data can be used both for prediction, as well as for post degradation analysis of shaft. This is because the data is collected from specific locations for the specific parameters that (as recognized by the inventors) capture information that is highly correlated with the particular degradation issues, especially through machine learning approaches.

A smart shaft is provided that is equipped with data acquisition capability such that it can record the data of the following conditions: temperature, vibrations, displacement, and/or speed. An example of the smart shaft is shown in FIG. 2.

The data points are captured, at a specified frequency, through sensors that will be in contact with the outer race of the ball bearing of the center bearing. The data from these sensors is then converted and sent to a gateway/receiver via Bluetooth Low Energy (BLE). The receiver collects the data and pushes it on the cloud, using global system for mobile (GSM). The data is then subjected to a Machine Learning algorithm to predict the estimated life of the joint. This life data is then sent to the manufacturer, customer, and/or the fleet owner.

In an example, table 1 illustrates sensors used to capture data points:

TABLE 1

| # | Sensor | Data Captured | Location |
|---|--------|---------------|----------|
| 1 | Analog Temperature sensors | Temperature | Between ball bearing outer race and center bearing rubber housing. |
| 2 | Accelerometer | Vibrations | Between center bearing rubber housing and top plate. |
| 4 | Displacement sensor | Displacement | On center bearing rubber |

Turning to FIG. 1, a printer circuit board (PCB) (e.g., a controller 112) may process data received from sensors 116, which may include the sensors listed in table 1, arranged in a vehicle 100. The data acquisition rate of the sensors may be selected based on operating conditions and the particular parameter. For example, the accelerometer and displacement data may be sampled at a higher rate than the temperature data. The PCB, Beacon, and Sensors may be powered by a battery (1000 mAh Coin cell) mounted on the other side of a universal joint cross, as shown in FIG. 2. The data is then sent to the receiver through BLE by a Beacon placed in the central casing.

The data is received by a Gateway/Data Logger 120 which then pushes it to the cloud 130 using a global system for mobiles (GSM) sim card. The Gateway may be placed in the vehicle cabin and powered using a battery/Dashboard universal serial bus (USB) output. The Gateway may also comprise a memory card that will store data when the GSM network is not available. In one example, the controller 112 may include instructions stored in memory thereof that cause the controller 112 to send real-time data to the cloud 130 when a connection is available and to store the data when the connection is not available. The vehicle 100 may include a modem, a router, a radio, Bluetooth, Wi-Fi, or other element for establishing a wireless connection with the cloud 130. The stored data may be pushed to the cloud via the Gateway, once the GSM signal is received. Once the Data is transmitted to the server 140 from the cloud 130, it undergoes post processing and is then displayed on the platform in a viewable format. The data is also pushed to a machine learning database 150 which predicts the life of the shaft based on past data. The machine learning algorithm can be trained with data from test vehicles fitted with degraded and non-degraded components at an update module 160. The estimated life is then shared with on-line tools, the customer, and/or fleet owners via a customer feedback module 170.

FIGS. 1-3B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation). FIGS. 2, 3A, and 3B are shown approximately to scale. However, other dimensions may be used.

Turning now to FIG. 2, it shows an embodiment 200 of different locations of various sensors and other devices relative to a shaft 202. In one example, the shaft 202 is a "smart" shaft, wherein components adjacent to the shaft 202 may gather and send data to the controller of the vehicle in wireless communication with the network of FIG. 1. The machine learning of the network may diagnose a condition of the shaft 202, leading to prophylactic maintenance, resulting in reduced wear and degradation of the shaft 202.

The shaft 202 may be mounted to an underbody of a vehicle via a top plate 204 and a center bearing bracket 206. The top plate 204 and the center bearing bracket 206 may be physically coupled to one another via two or more fasteners. In one example, the fasteners physically coupling the top plate 204 and the center bearing bracket 206 may also mate with a corresponding opening of the underbody, thereby physically coupling the top plate 204 and the center bearing bracket 206 to the underbody.

The center bearing bracket 206 may include a center bearing material 208. The center bearing material 208 may be rubber, foam, or other type of dampening material. In one example, the center bearing material 208 is rubber.

A center bearing 210 may be arranged interior to the center bearing material 208. In the embodiment 200, the center bearing material 208 separates the bearing 210 from the center bearing bracket 206 and the top plate 204. The shaft 202 may extend through an opening of the bearing 210. The shaft 202 may rotate within the bearing 210 while the center bearing material 208 remains stationary. In one example, the bearing 210 is a ball bearing.

A plurality of sensing devices may be spaced about the bearing 210. In one example, the plurality of sensing devices may include a temperature sensor 212, a displacement sensor 214, and an accelerometer 216. In one example, the center bearing material 208 forms a bearing compartment configured to house each of the temperature sensor 212, the displacement sensor 214, and the accelerometer 216. In one example, the bearing compartment may be shaped to integrally house each of the temperature sensor 212, the displacement sensor 214, and the accelerometer 216.

In some embodiments, the temperature sensor 212 may be positioned to sense a temperature of the bearing 210. The displacement sensor 214 may be configured to sense movement of the bearing 210 in three-dimensions, as shown via the axis system 290 including an x-axis, a y-axis, and a z-axis. The accelerometer 216 may be configured to sense a change in speed of the bearing 210.

The bearing compartment may further include a battery 218 arranged therein. The battery 218 may be configured to provide power to each of the temperature sensor 212, the displacement sensor 214, and the accelerometer 216 via a circuit 219 extending through various areas of the bearing compartment to the sensors. In one example, the battery 218 is a coin cell battery mounted on an opposite side of a joint of the embodiment 200 relative to the plurality of sensors.

Turning now to FIG. 3A, it shows a cross-sectional view 300 of the bearing 210 taken along cutting plane 3-3 of FIG. 2. The cross-sectional view 300 illustrates the temperature sensor 212 and the accelerometer 216 extending into an outer race 302 of the bearing 210. By doing this, data gathered with regard to the condition of the bearing 210 may be more accurate relative to positioning the sensors more distal to the bearing 210.

Turning now to FIG. 3B, it shows a cross-section view 350 of the accelerometer 216 taken along the cutting plane 3-3 of FIG. 2. The accelerometer 216 may include a mass 352 coupled to a spring 354. Movement of the mass 352 may be measured by electric, piezoelectric, piezoresistive, or capacitive elements 356. The mass 352 may be cantilevered to the element 356, wherein movement of the mass 352 may be detected by the element 356.

Turning now to FIG. 4, it shows a method 400 for determining a condition of the bearing. Instructions for the method 400 may be executed via instructions stored on memory of the controller of the vehicle and a processor of the network. The method 400 begins at 402, which includes receiving data from the sensors. The sensors may include the temperature sensor, the displacement sensor, and the accelerometer, wherein feedback from the sensors is delivered to the controller of the vehicle. The data may illustrate real-time conditions of the central bearing and/or the shaft extending through the central bearing. A sample rate of one or more of the sensors may be adjusted in response to conditions. For example, sample rates of the displacement sensor and the accelerometer may be increased relative to a sample rate of the temperature sensor in response to the vehicle driving on a harsh or uneven road. In another example, the sample rates of the sensors may be identical.

At 404, the method 400 may include determining if a connection to the network is available. If connection is not available, due to an internet outage or obstruction, then at 406, the method 400 may include storing the data until a connection is available. The data may be stored in memory of the vehicle. In one example, the data may be stored in portable memory that is removable from a port of the vehicle.

At 408, the method 400 may include sending the data to the network in response to the connection being available. Data previously stored may be pushed to the cloud for analysis.

At 410, the method 400 may include predicting a condition of the shaft via a machine learning model. In one example, predicting the condition may include performing a degradation analysis via the machine learning model. The machine learning model may be continuously updated via data provided from a plurality of vehicles. The data may be categorized based on driving conditions of each of the vehicles. Driving conditions may include, but are not limited to, one or more of a vehicle make, a vehicle model, a vehicle maintenance history, a vehicle location, a driver behavior, a vehicle average speed, an average vehicle weight, a vehicle odometer reading, a terrain driven, a suspension traveled distance, a cargo weight, aftermarket devices, and the like. Outcomes of the components based on the driving conditions may be learned by the machine learning model such that degradation of a component may be predicted and/or anticipated. The machine learning model may be further configured to delay or extend the RUL of a component via prophylactic maintenance and/or replacement of various sub-components (e.g., fasteners).

At 412, the method 400 may include determining if user action is desired. User action may include maintenance or other action item demanded when a component or portion thereof is requested to be serviced. In one example, lubrication, cleaning, tightening, replacing, or other action may be desired. If the user action is not desired, then at 414, the method 400 may include sending a condition of the shaft to the user without the action item(s). The condition may include a status of the shaft along with a RUL, next desired maintenance, quality of lubricant, status of the center bearing, average temperature, average displacement, average acceleration, and the like. The condition may be sent in a phone call, text message, email, or other transmission. The transmission may include data displays, charts, graphs, and the like which may illustratively display changes to the shaft data over time. For example, the average temperature of a current condition may be compared to a previous average temperature. As another example, the average displacement and the average acceleration may be compared to a previous average displacement and a previous average acceleration, respectively. By doing this, the user may easily see changes to the shaft conditions.

If user action is desired, then at 416, the method 400 may include sending the condition to the user with suggested action item(s). In one example, the suggested action items may include directions to recommended service center and/or to automotive supply centers with requested items in stock.

At 418, the method 400 may include requesting feedback following completion of the action item(s).

At 420, the method 400 may include updating the machine learning model following reception of the feedback. Updating the model may include increasing a confidence score of the model in response to the predicted condition of the shaft matching a current condition. In another example, updating the model may include adjusting an assessment of the condition in response to the predicted condition not matching the current condition. The machine learning model may analyze previous data of the shaft in relation to the current condition to modify parameters for predicting conditions of other shafts undergoing similar conditions to the shaft. By doing this, the machine learning prediction of the condition of the shaft may be enhanced.

In this way, it is possible to achieve the following technical effects: provide real-time product monitoring, enhance preventive maintenance/service cycle through prediction of estimated product life, standardize driver practices in-order to maximize vehicle/component life, mapping theoretical and actual product performance, and/or provide efficient and accurate root cause analysis.

In one example a kit is provided, including the sensors mentioned above along with mounting components for mounting the sensors in the locations specified herein. Further the kit provides a subscription for online processing of the data generated.

The disclosure provides support for a center bearing diagnostic or prognostic method including generating a degradation analysis of the center bearing from real-time vehicle operating data, the data including feedback from one or more of a temperature sensor, a displacement sensor, and an accelerometer wired to a battery integrally arranged in a bearing compartment of a vehicle. A first example of the method, further includes where generating the degradation analysis via a machine learning model, wherein the data is wirelessly sent to a network from the vehicle. A second example of the method, optionally including the first example, further includes where the vehicle is a vehicle of a vehicle fleet.

The disclosure further provides support for a system including a bearing sensor system comprising a temperature sensor, a displacement sensor, and an accelerometer wired to a battery integrally arranged in a bearing compartment. A first example of the system further includes where the bearing sensor system is configured to provide real-time data regarding a bearing of a shaft of a vehicle, and wherein the real-time data is wirelessly sent to a network from the vehicle via a controller. A second example of the system, optionally including the first example, further includes where the network comprises a processor with instructions stored on memory thereof that when executed cause the processor to determine a condition of the shaft based on an outcome of a machine learning model receiving the real-time data. A third example of the system, optionally including one or more of the previous examples, further includes where the controller comprises instructions stored on memory thereof that when executed cause the controller to store the real-time data when a connection to the network is unavailable and send the real-time data to the network when the connection is available. A fourth example of the system, optionally including one or more of the previous examples, further includes where the temperature sensor is positioned between a ball bearing outer race and a center bearing rubber housing. A fifth example of the system, optionally including one or more of the previous examples, further includes where the accelerometer is positioned between a center bearing rubber housing and a top plate. A sixth example of the system, optionally including one or more of the previous examples, further includes where the displacement sensor is positioned in a center bearing rubber housing. A seventh example of the system, optionally including one or more of the previous examples, further includes where the bearing supports a shaft of a vehicle. An eighth example of the system, optionally including one or more of the previous examples, further includes where the bearing is a ball bearing and the shaft is a propeller shaft. A ninth example of the system, optionally including one or more of the previous examples, further includes where the battery is arranged on a first side of the bearing and the temperature sensor, the displacement sensor, and the accelerometer are arranged on a second side of the bearing opposite the first side.

The disclosure further provides support for a kit for a center bearing of a vehicle, the kit including a battery and a sensor system including a temperature sensor, a displacement sensor, and an accelerometer configured to be wired to the battery, the battery configured to be integrally arranged in a bearing compartment. A first example of the kit further includes information for a subscription for on-line processing of the data generated and access to software for receiving analysis results of the data. A second example of the kit, optionally including the first example, further includes where the bearing compartment is arranged between a top plate and a center bearing bracket. A third example of the kit, optionally including one or more of the previous examples, further includes where the center bearing bracket is physically coupled to the top plate via two or more coupling elements, and wherein the two or more coupling elements are configured to physically couple the center bearing bracket and the top plate to an underbody of the vehicle. A fourth example of the kit, optionally including one or more of the previous examples, further includes where the bearing compartment separates the center bearing from a top plate and a center bearing bracket. A fifth example of the kit, optionally including one or more of the previous examples, further includes where the bearing compartment is rubber. A sixth example of the kit, optionally including one or more of the previous examples, further includes where the temperature sensor and the accelerometer extend into an outer race of the center bearing.

Note that the example control and estimation routines included herein can be used with various vehicle system configurations. The control methods and routines disclosed herein may be stored as executable instructions in non-transitory memory and may be carried out by the control system including the controller in combination with the various sensors, actuators, and other hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A center bearing diagnostic or prognostic method comprising:
generating, via instructions stored in memory coupled with a processor, a degradation analysis of the center bearing from real-time vehicle operating data, the data including feedback from a temperature sensor, a displacement sensor, and an accelerometer wired to a battery integrally arranged in a bearing compartment of a vehicle, the bearing compartment further including the processor and memory, the instructions including instructions to send real-time data to a remote cloud, instructions for a subscription for on-line processing of data generated via the sensor system at the remote cloud, and access to software for receiving analysis results of the data from the cloud;
wherein:
the battery is configured to be integrally arranged in a bearing compartment arranged between a top plate and a center bearing bracket and separating the top plate from the center bearing bracket, the center bearing bracket physically coupled to the top plate via two or more coupling elements, the two or more coupling elements configured to physically couple the center bearing bracket and the top plate to an underbody of the vehicle;
the data is sent to the cloud in response to a connection to the cloud being available; and
a condition of the center bearing and/or a shaft of the center bearing is predicted using a machine learning (ML) model stored at the cloud, the ML model performing a degradation analysis of the shaft, the ML model continuously updated via a second set of data provided from a plurality of vehicles, the second set of data categorized based on driving conditions of each vehicle of the plurality of vehicles, wherein the driving conditions include one or more of a vehicle make, a vehicle model, a vehicle maintenance history, a vehicle location, a driver behavior, a vehicle average speed, an average vehicle weight, a vehicle odometer reading, a terrain driven, a suspension traveled distance, a cargo weight, and aftermarket devices.

2. The method of claim 1, wherein the vehicle is a vehicle of a vehicle fleet.

3. A system, comprising:
a center bearing sensor system comprising a temperature sensor, a displacement sensor, and an accelerometer wired to a battery integrally arranged in a bearing compartment;
a processor and memory with instructions stored therein, including instructions to send real-time data to a remote cloud, the processor and memory coupled with the battery and the bearing sensor system and instructions for a subscription for on-line processing of data generated via the sensor system at the remote cloud, and access to software for receiving analysis results of the data from the cloud;
wherein:
the battery is configured to be integrally arranged in a bearing compartment arranged between a top plate and a center bearing bracket and separating the top plate from the center bearing bracket, the center bearing bracket physically coupled to the top plate via two or more coupling elements, the two or more coupling elements configured to physically couple the center bearing bracket and the top plate to an underbody of the vehicle;
the data is sent to the cloud in response to a connection to the cloud being available; and
a condition of the center bearing and/or a shaft of the center bearing is predicted using a machine learning (ML) model stored at the cloud, the ML model performing a degradation analysis of the shaft, the ML model continuously updated via a second set of data provided from a plurality of vehicles, the second set of data categorized based on driving conditions of each vehicle of the plurality of vehicles, wherein the driving conditions include one or more of a vehicle make, a vehicle model, a vehicle maintenance history, a vehicle location, a driver behavior, a vehicle average speed, an average vehicle weight, a vehicle odometer reading, a terrain driven, a suspension traveled distance, a cargo weight, and aftermarket devices.

4. The system of claim 3, wherein the bearing sensor system is configured to provide real-time data regarding the shaft of the vehicle.

5. The system of claim 4, wherein the network comprises a network processor with instructions stored on memory thereof that when executed cause the network processor to determine a condition of the shaft based on an outcome of a machine learning model receiving the real-time data.

6. The system of claim 4, wherein the processor further comprises instructions that when executed cause the processor to store the real-time data when a connection to the network is unavailable.

7. The system of claim 3, wherein the temperature sensor is positioned between a ball bearing outer race and a center bearing rubber housing.

8. The system of claim 3, wherein the accelerometer is positioned between a center bearing rubber housing and a top plate.

9. The system of claim 3, wherein the displacement sensor is positioned in a center bearing rubber housing.

10. The system of claim 3, wherein the center bearing is a ball bearing.

11. The system of claim 3, wherein the battery is arranged on a first side of the bearing and the temperature sensor, the displacement sensor, and the accelerometer are arranged on a second side of the bearing opposite the first side.

12. A kit for a center bearing of a vehicle, the kit comprising:
a battery and a sensor system including a temperature sensor, a displacement sensor, and an accelerometer configured to be wired to the battery;
a processor and memory with instructions stored therein, including instructions to send real-time data to a remote cloud, the processor and memory coupled with the battery and the sensor system; and
instructions for a subscription for on-line processing of data generated via the sensor system at the remote cloud, and access to software for receiving analysis results of the data from the cloud;
wherein:
the battery is configured to be integrally arranged in a bearing compartment arranged between a top plate and a center bearing bracket and separating the top plate from the center bearing bracket, the center bearing bracket physically coupled to the top plate via two or more coupling elements, the two or more coupling elements configured to physically couple the center bearing bracket and the top plate to an underbody of the vehicle;

the data is sent to the cloud in response to a connection to the cloud being available; and a condition of the center bearing and/or a shaft of the center bearing is predicted using a machine learning (ML) model stored at the cloud, the ML model performing a degradation analysis of the shaft, the ML model continuously updated via a second set of data provided from a plurality of vehicles, the second set of data categorized based on driving conditions of each vehicle of the plurality of vehicles, wherein the driving conditions include one or more of a vehicle make, a vehicle model, a vehicle maintenance history, a vehicle location, a driver behavior, a vehicle average speed, an average vehicle weight, a vehicle odometer reading, a terrain driven, a suspension traveled distance, a cargo weight, and aftermarket devices.

13. The kit of claim 12, wherein the bearing compartment is rubber.

14. The kit of claim 12, wherein the temperature sensor and the accelerometer extend into an outer race of the center bearing.

* * * * *